March 30, 1965
D. COSTES ETAL
3,175,957
NUCLEAR REACTOR FUEL CHANNEL ASSEMBLY
WITH NON-RETURN DEVICE
Filed May 22, 1962
2 Sheets-Sheet 1
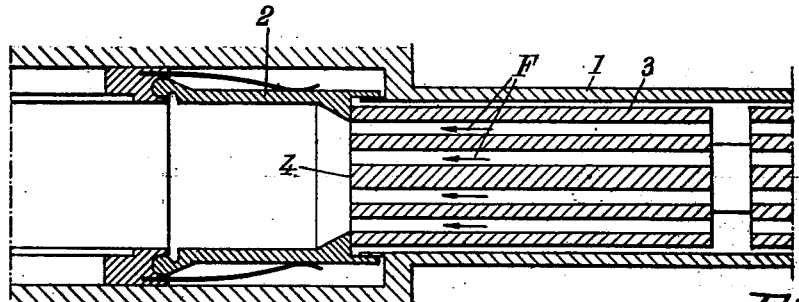
Fig.1
Fig.2
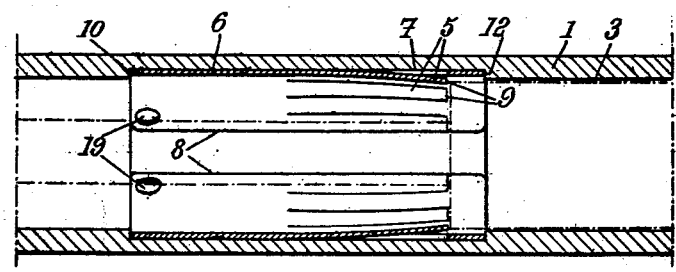
Fig.3
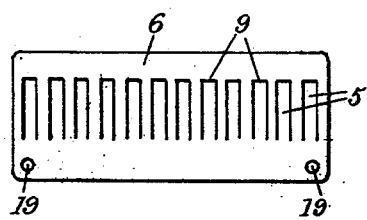
Fig.4.
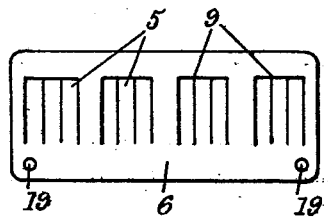
INVENTORS
DIDIER COSTES
NOËL LAURENT
ALPHONSE PEUCHMAUR March 30, 1965
D. COSTES ETAL
3,175,957
NUCLEAR REACTOR FUEL CHANNEL ASSEMBLY
WITH NON-RETURN DEVICE
Filed May 22, 1962
2 Sheets-Sheet 2
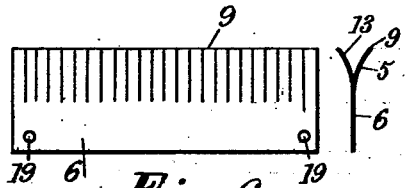
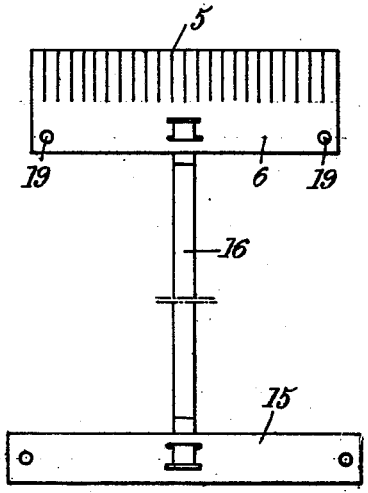
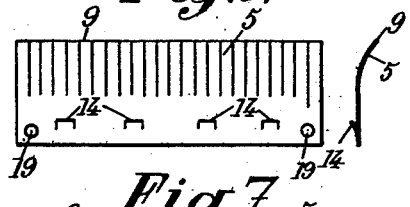
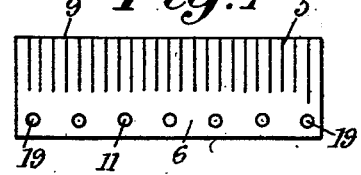
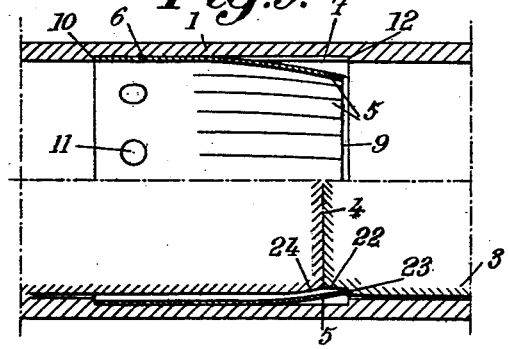
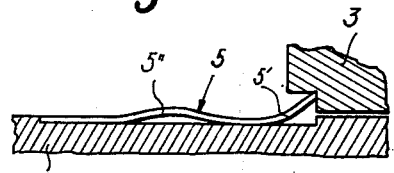
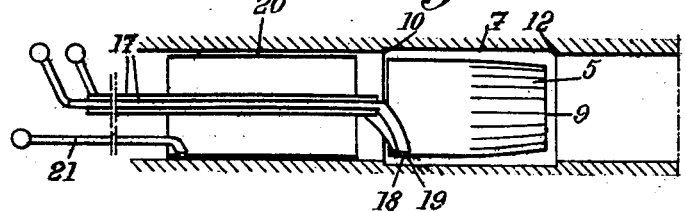
INVENTORS
DIDIER COSTES
NOËL LAURENT
ALPHONSE PEUCHMAUR
BY
ATTORNEYS United States Patent Office 3,175,957
Patented Mar. 30, 1965

3,175,957
NUCLEAR REACTOR FUEL CHANNEL ASSEMBLY WITH NON-RETURN DEVICE
Didier Costes, Paris, Noël Laurent, Saint-Mande, and Alphonse Peuchmaur, Boulogne-sur-Seine, France, assignors to Commissariat à l'Energie Atomique, Paris, France
Filed May 22, 1962, Ser. No. 196,729
Claims priority, application France, May 27, 1961, 863,095
2 Claims. (Cl. 176—87)

The present invention relates to nuclear reactors and is concerned with a non-return device for preventing a fuel element from moving back once it has been inserted into a channel of the reactor. The said device is especially applicable to refuelling systems in which the fuel elements are inserted one at a time, each element inserted pushing the others.

A known method is to provide in the channels of a nuclear reactor one-way clutches which prevent any backward movement of the fuel elements inserted in spite of the forces which can be applied in this direction. The said one-way clutches have the disadvantage of being bulky and cumbersome and of being constituted by a substantial volume of neutron-absorbing material.

The present invention has for its object the design of a non-return device for preventing fuel elements from moving back which overcomes the drawbacks of prior art systems and which provides reliable operation and can readily be taken apart.

The non-return device in accordance with the invention for preventing the back movement of fuel elements in a nuclear reactor channel comprises pawls for retaining the fuel elements and permitting the forward movement of these latter, characterized in that the said pawls are constituted by resilient arms which are bent towards the axis of the channel and integral with a member which butts axially against the wall of the said channel.

The invention will become more readily apparent from a study of the description which follows below, reference a being made to the accompanying drawings in which a certain number of forms of embodiments of the invention are shown by way of example without any limitation being implied, and in which:

FIG. 1 shows in axial cross-section the combined assembly of a reactor channel outlet and of a fuel-element feed system in accordance with a known arrangement.

FIG. 2 shows in axial cross-section a similar assembly designed in accordance with the invention.

FIGS. 3 to 8 are developed views which show in accordance with a number of alternative forms members intended to form a retaining device of the type shown in FIG. 2.

FIG. 9 shows a combined assembly of the same type as that shown in FIG. 2, in accordance with another form of embodiment of the invention.

FIG. 9a shows diagrammatically the shape taken by a resilient arm when once the said arm has been subjected to a series of mechanical and thermal processing cycles.

FIG. 10 finally shows in diagrammatic axial cross-section means also in accordance with the invention for the insertion of the retaining members inside the channels.

The invention applies especially to loading systems in which the new fuel elements inserted in a channel push the others which are already located therein and drive out at the other end of the channel the depleted fuel elements so as to permit the extraction thereof.

There already exist fuel-element feed systems of the type illustrated in FIG. 1, in which a one-way clutch is provided at the entrance of each reactor channel such as 1 for the purpose of retaining the last fuel element inserted in the channel and preventing any back movement of the "train" of fuel elements under the action of forces such as the force of gravity (especially when the channels are vertical and the reactor is loaded from the bottom), the pressure of the heat-transferring fluid which circulates in the channels, etc., which have a tendency to urge the "train" in the direction opposite to that in which the feed of new fuel elements is effected.

In the system shown in FIG. 1, the holding means are constituted by pawls 2 fitted with return springs and which come into engagement against the base 4 of the fuel element after insertion of a fuel element 3 in order to prevent this latter from moving out under the action of forces such as the force of gravity, etc., which thrust back the said element in the direction shown by the arrows F.

Such one-way clutch means are usually fairly bulky, with resulting difficulties in the assembly thereof. Furthermore, they comprise elements of substantial section which are composed of neutron-absorbing materials and which would be liable to disturb the operation of a reactor if they were placed either in the core or in the reflector.

In order to overcome these disadvantages and also to permit of easier assembly, the one-way clutch means are constituted in accordance with the invention by resilient arms carried by a body having a relatively thin section, the said arms closing over the fuel element when once this latter has been inserted so as to prevent this latter from moving out.

It will be understood that in order to carry this arrangement into practical effect, there can be employed a large number of forms of embodiment which all differ from each other, namely:

In the number of the said resilient arms, which can be either substantially juxtaposed as indicated in FIGS. 5 to 10 or spaced apart as has been assumed to be the case in FIGS. 2 to 4.

In the manner in which the resilient arms are formed with respect to their supports 6 and can either be flush with the edge of the said support as has been assumed to be the case in FIGS. 5 to 10 or else can be formed in the interior of the said support 6 ("lantern" arrangement) as assumed in FIGS. 2 to 4.

The support 6 is preferably formed by a rolled metallic sheet in such manner as to constitute a tubular thimble which is elastically deformable in the radial direction, this form of embodiment being particularly well adapted for the purpose of fixing the said body in any particular zone of the channel, due allowance being made for the fact that the said thimble 6 must come into abutment with appropriate means designed to withstand the thrust of the fuel elements which are in position or moving inside the channel.

These positioning and abutment means can be arranged in any appropriate manner but will preferably consist of one or a number of counterbores formed in the channel for the purpose of containing the thimble 6 which will also as a rule be relatively thin, and for the purpose of forming an abutment shoulder which prevents the axial sliding of the thimble 6 when once this latter has been inserted and placed in position.

A number of forms of embodiment are of course possible such as those which will be explained precisely below.

There is formed at the entrance of the channel 1 which is shown in FIG. 2 a counterbore 7 which is intended to house the thimble 6 formed by rolling-up a sheet metal plate of the type shown in FIGS. 6 to 8, a free slot 8 being left after rolling-up the said plate.

It being assumed that the thimble 6 is fitted into position inside its counterbore, it can be seen that, when the fuel element 3 is inserted, it opens out the resilient arms 5, then moves along these latter, passes beyond them, and comes to bear against the tip 9 of the said resilient arms which have returned elastically to their initial position.

The reaction applied on the stack of fuel elements is transmitted to the thimble 6 which bears on the abutment shoulder 10 which delimits the counterbore 7 at the fuel-element input end.

Further means can be devised for the purpose of holding the thimble 6 in position under the action of the thrust applied by the stack of fuel elements. It accordingly follows that, as shown diagrammatically in FIG. 9, the plate which is intended to form the thimble 6 could be provided with openings 11 into which tongues carried by the channel wall could penetrate.

The front portion of the thimble 6 must be made to come into abutment so as to ensure that this latter does not slide forward at the time of movement of the train of fuel elements. To this end, that shouldered portion 12 of the counterbore 7 which is located at the end opposite to the shoulder 10 can serve as an abutment:

Either for the corresponding rim of the thimble 6 in the "lantern" arrangement of FIGS. 2 to 4, Or for the tips of the resilient arms 13 which are deformed outwards and which alternate with the active arms 5, in the case in which the said arms open out up to the corresponding edge of the thimble plate, as shown in FIG. 5.

In this latter case, the same effect could be obtained with small arms 14 (as shown in FIG. 6) which are formed by strips punched out in the body of the thimble 6 and which are intended to butt against additional shoulders of the counterbore 7. Any other like means could of course be provided.

FIG. 8 illustrates another device of the same kind in which an additional anchoring means is provided at the rear of the thimble in the form of a plate 15 which is rolled-up in the same manner as the thimble 6 and which is anchored in any appropriate manner, for example inside a recess of the channel. The members 6 and 15 are coupled together by means of one or a number of strips 16.

It would also be feasible to make use of thimbles 6 which are fairly long in the direction of the length of the channel so that the anchoring of the said thimbles is effected at the rear, in a region of the pile in which a relatively substantial increase in diameter could be accepted, in which case any anchoring means could be devised.

That portion of the channel which carries the thimble and its anchoring means can be constituted by a separate part which has greater mechanical strength than the normal portion of the guide tube and which can be coupled thereto both at the front and rear end, for example by means of a conical threaded coupling.

In order to fit a thimble in position, it is usually sufficient to draw the ends of the thimble plate together during its insertion, then to release them as soon as the said thimble arrives inside the counterbore 7 in which it is intended to be fitted.

The contraction of the thimble is effected for example by means of pincers 17 (as shown in FIG. 10), the gripping members 18 of which penetrate inside openings 19 formed in the thimble plate. By manipulating the said pincers after rolling up the plate 6, the radial size of the thimble is reduced to a value which permits this latter to be inserted in the channel.

Instead of pincers, it would be possible to employ a carrying tube 20 operated by means of a rod 21 and inside which the thimble 6 could be previously inserted in a slightly withdrawn position, while the said tube 20 could in turn be arranged in the form of a sleeve designed to be contracted by an operating means which has not been shown in the drawings. In this latter case, the thimble 6 and sleeve 20 which are thus assembled together are pushed forward until these latter come opposite to or in proximity to the counterbore 7, whereupon the sleeve 20 is withdrawn while preventing the thimble 6 from moving back, thereby setting this latter in position.

The invention also extends to certain arrangements of fuel elements, the shape of which is modified so that the operation of the retaining means can be facilitated.

In accordance with one of these arrangements, the rear portion of each fuel element comprises a stepped portion 22 having a slightly smaller diameter than that of the fuel element as shown in the bottom half of FIG. 9. The said stepped portion provides a shoulder 23 intended to be applied against the tips of the resilient arms 5 so as to ensure the correct operation of the retaining means.

In accordance with a further arrangement which is preferably employed at the same time as the foregoing arrangement, the front end of the fuel elements is given the shape of a truncated bullet-nose 24 (as shown in FIG. 9). The diameter at the end of the truncated bullet-nose portion is preferably the same as that of the stepped portion 22.

The new fuel element accordingly comes into contact with the train of fuel elements in position and moves this latter forward before coming into contact with the resilient arms and opening them outwards. In this manner, the compressed arms are not subjected to a bending movement of too great an amplitude, which would result in their rapid deformation.

In order to simplify the construction of the fuel elements, the front ends of these latter can be made identical to the rear ends, in which case the stepped portion of small diameter applies a movement of thrust prior to a movement of outward displacement.

FIG. 9a shows the shape taken by the resilient arms after a sufficiently long period of service. Under the thrust of the fuel elements, each resilient arm 5 arches and takes a shape which corresponds to an incipient buckling. The portion 5' then constitutes a spring-catch, whilst the portion 5" only constitutes a catch-support which transmits the compression force and permits the inwardly tilting movement of the portion 5' forming the pawl.

By way of example, a thimble of the type shown in FIG. 9 of ordinary stainless steel sheet of 1 millimeter thickness in which are formed resilient arms 60 millimeters in length and which is fitted inside a channel of 85 millimeters in diameter withstands a pressure of more than one ton.

The device in accordance with the invention offers a number of advantages as compared with devices of the prior art, in particular the following:

The said device has only a small diametral size, thereby facilitating the insertion of the retaining means, even inside a metallic pressure tube or inside the reflector of a reactor, The said device comprises only a small mass of neutron-absorbing materials, The said device can readily be displaced or dismantled, for example if it is desired as an exceptional measure to unload a channel through the inlet opening, The said device is of very simple construction, The said device provides absolute safety: in the case of stress greater than the maximum buckling pressure, the resilient arms sag while exaggerating the deformation which is illustrated in FIG. 9a but block the channel while continuing to prevent the fuel elements from moving back.

The invention is obviously not limited to those applications or to those forms of embodiment of the various parts thereof which have been described in the foregoing but comprises within its scope all alternative forms thereof.

What we claim is:

1. A nuclear reactor fuel channel assembly including a non-return device comprising a channel wall having a longitudinal axis forming a duct and a path for nuclear fuel elements, a counterbore of predetermined length in an end of said wall, a non-return device in said duct preventing movement of the nuclear fuel elements in a predetermined direction along said axis after they have been inserted into said duct past said device in a direction opposite to said predetermined direction, said device comprising a radially expandable thimble of uniform thickness throughout its length expanded and locked in said counterbore and having an axial length slightly less than said predetermined length and axially disposed slits in said thimble forming resilient arms in said thimble integral therewith and terminating short of the ends thereof, said arms being inclined toward said axis of said wall in their at rest condition to enter the path of the fuel elements.

2. A nuclear reactor fuel channel assembly including a non-return device comprising a channel wall having a longitudinal axis forming a duct and a path for nuclear fuel elements, a counter bore of predetermined length in an end of said wall, a non-return device in said duct preventing movement of the nuclear fuel elements in a predetermined direction along said axis after they have been inserted into said duct past said device in a direction opposite to said predetermined direction, said device comprising a radially expandable thimble of uniform thickness throughout its length expanded and locked in said counter bore and having an axial length slightly less than said predetermined length and axially disposed slits in said thimble forming resilient arms in said thimble integral therewith, said arms being inclined toward said axis of said wall in their at rest condition to enter the path of the fuel elements.

References Cited by the Examiner

UNITED STATES PATENTS

| | | | |
|---|---|---|---|
| 2,727,761 | 12/55 | Elliott et al. | 285—322 X |
| 2,756,858 | 7/56 | Kasschan. | |
| 3,009,868 | 11/61 | Moulin | 176—30 |
| 3,020,887 | 2/62 | Hobson et al. __0__ | 92—26 |
| 3,071,529 | 1/63 | Davies | 221—81 |

FOREIGN PATENTS

| | | |
|---|---|---|
| 224,117 | 9/59 | Australia. |
| 1,245,643 | 10/60 | France. |

CARL D. QUARFORTH, *Primary Examiner.*

REUBEN EPSTEIN, *Examiner.*